United States Patent [19]

Nishikawa et al.

[11] Patent Number: 5,312,682
[45] Date of Patent: May 17, 1994

[54] PHOTOGRAPHIC PRINTING PAPER SUPPORT

[75] Inventors: Yasuo Nishikawa; Takahito Miyoshi; Sugihiko Tada, all of Fujinomiya, Japan

[73] Assignee: Fuji Photo Film Co., Ltd., Kanagawa, Japan

[21] Appl. No.: 32,251

[22] Filed: Mar. 17, 1993

[30] Foreign Application Priority Data

Mar. 17, 1992 [JP] Japan ................................. 4-091814

[51] Int. Cl.$^5$ ....................... B32B 27/08; G03C 1/775
[52] U.S. Cl. ................................... 428/328; 428/330; 428/332; 428/412; 428/425.1; 428/481; 428/513; 430/538; 430/537
[58] Field of Search ............... 428/328, 513, 481, 332, 428/330, 412, 425.1

[56] References Cited

U.S. PATENT DOCUMENTS

| | | | |
|---|---|---|---|
| 4,895,757 | 1/1990 | Wysk et al. | 428/516 |
| 5,008,150 | 4/1991 | Ashida et al. | 428/516 |
| 5,082,724 | 1/1992 | Katsura et al. | 428/516 |

*Primary Examiner*—P. C. Sluby
*Attorney, Agent, or Firm*—Sughrue, Mion, Zinn, Macpeak & Seas

[57] ABSTRACT

A photographic printing paper support wherein one side of the raw paper is covered by a composition containing titanium oxide dispersed in polyethylene terephthalate resin or a mixture of polyethylene terephthalate and another resin, and the other side is covered by a composition containing calcium carbonate dispersed in polyethylene terephthalate resin or a mixture of polyethylene terephthalate with another resin, which can provide an excellent photographic paper having good water resistance, whightness and gloss is disclosed.

10 Claims, No Drawings

PHOTOGRAPHIC PRINTING PAPER SUPPORT

FIELD OF THE INVENTION

This invention relates to a photographic printing paper support, and in particular to a photographic printing paper support which does not tend to curl with time.

BACKGROUND OF THE INVENTION

In photographic printing papers, the surface of the raw paper to be emulsion-coated is generally covered by a polyethylene or other polyolefin resin layer in which titanium oxide has been dispersed by kneading so as to improve water resistance and light reflectance. The titanium oxide in particular improves the whiteness of the paper, but it also tends to adversely affect the flatness of the paper.

In high gloss printing papers which are at present most highly valued, it is desired to improve the smoothness and gloss of the paper surface in order to improve the appearance of the image. Good results can be obtained by replacing the polyolefin by polyethylene terephthalate, but the paper suffered from the disadvantage that it curled with the passage of time.

The Inventors, after detailed studies, found that this tendency to curl is reduced by covering the surface of the raw paper to be emulsion-coated with a composition comprising a dispersion of titanium oxide in polyethylene terephthalate or in a resin having polyethylene terephthalate as its principal constituent.

SUMMARY OF THE INVENTION

It is therefore an object of this invention to provide a photographic printing paper support having excellent water resistance, whiteness and surface smoothness which does not tend to curl with time.

The aforesaid object of the invention is attained by a photographic printing paper support wherein one side of the raw paper is covered by a composition containing titanium oxide dispersed in polyethylene terephthalate resin or a mixture of polyethylene terephthalate and another resin, and the other side is covered by a composition containing calcium carbonate dispersed in polyethylene terephthalate resin or a mixture of polyethylene terephthalate with another resin.

A photographic printing paper having excellent water resistance, whiteness and gloss may be obtained by applying, using any of the known methods, a layer of photographic emulsion to the layer of composition containing titanium oxide on a support of the present inventions

DETAILED DESCRIPTION OF THE INVENTION

The other resin added to polyethylene terephthalate (referred to as the blend resin) may be suitably chosen from among resins which can be extruded at 270°–350° C. e.g. polyolefin resins such as polyethylene or polypropylene, polyether resins such as polyethylene glycol, polyoxymethylene and polyoxypropylene, urethane resins such as polyester polyurethanes and polyether polyurethanes, and polycarbonates or polystyrenes.

Two or more of the aforesaid blend resins may also be used in conjunction.

The blending ratio of the polyethylene terephthalate and the blend resin is suitably determined according to the polymerization degree and type of blend resin, but in the case of polyolefin resins, this ratio in terms of weight preferably lies in the range 100:0–80:20. If the blending ratio of the blend resin is greater than 20 weight %, the toughness of the photographic printing paper support decreases, and its surface smoothness is unsatisfactory.

If a resin other than a polyolefin resin is used, the aforesaid blending ratio may lie in the range 100:0–40:60. If the blending ratio of the blend resin exceeds 60 weight %, the curl of the support with time cannot be adequately prevented.

The titanium oxide used in this invention may be in the anatase or rutile form, and its average particle size should lie in the range 0.1–0.8, $\mu$m. If this particle size is less than 0.1 $\mu$m, it is difficult to disperse it evenly throughout the resin layer. If on the other hand it is greater than 0.8 $\mu$m, flatness of the photographic printing paper support surface cannot be obtained, and the whiteness is unsatisfactory. It is further desirable that the amount of titanium oxide lies in the range 2–20 weight %.

It is preferable that the average particle size of calcium carbonate used in this invention lies in the range 0.01–1.5 $\mu$m. If this particle size is less than 0.01 $\mu$m, dispersion is difficult as in the case of the aforesaid titanium oxide, while if it is greater than 1.51 $\mu$m, flatness of the photographic printing paper support surface cannot be obtained. It is further desirable that the amount of calcium carbonate lies in the range 1–30 weight %.

The titanium oxide or calcium carbonate may be easily mixed with the aforesaid polyethylene terephthalate by any of the usual methods.

In order to manufacture the photographic printing paper support of this invention, one surface of the raw paper is covered by a composition comprising polyethylene terephthalate resin or polyethylene terephthalate resin mixed with a blend resin and titanium oxide so as to form the surface to be emulsion-coated, and the other surface of the raw paper is coated with a composition comprising polyethylene terephthalate resin or polyethylene terephthalate resin mixed with a blend resin and calcium carbonate.

It is preferable that the thickness of the resin layer covering each side of the raw paper lies in the range 5–50 $\mu$m and particularly preferable that it lies in the range 15–35 $\mu$m. If the thickness is greater than 50 $\mu$m, the covering layer easily breaks, while if it is less than 5 $\mu$m, the water resistance of the photographic printing paper support is insufficient and its toughness declines. Further, from the viewpoint of preventing curl, it is preferable that the thickness of the covering on each surface is approximately the same.

In order to apply the aforesaid composition to the raw paper, the raw paper surface may first be prepared by corona discharge treatment or by priming with an undercoat.

In the support of this invention, the raw paper surface is covered by a resin containing polyethylene terephthalate as its principal constituent which is known to give better surface smoothness than polyolefin. The printing paper therefore, while retaining the same water resistance and whiteness of conventional papers, has improved surface smoothness and excellent gloss. Further, one surface of the raw paper is covered by a composition containing titanium oxide mixed with a resin having polyethylene terephthalate as its principal constituent, and the other surface is covered by a composition containing calcium carbonate mixed with a resin having polyethylene terephthalate as its principal constituent. The paper therefore does not curl with time.

EXAMPLES

This invention will now be described in more detail by specific examples, but it should be understood that the invention is by no means limited to these examples.

EXAMPLES 1-4 and COMPARATIVE EXAMPLE 1

A composition containing titanium oxide shown in Table 1 was applied to one surface of a raw paper of thickness 180 μm, and a composition containing calcium carbonate shown in Table 2 was applied to the other side of the paper. Both compositions were hot extruded at 300° C. so as to form laminated layers of thickness 25-30 μm. The curl of the support obtained was evaluated, and the results are shown in Table 2.

TABLE 1

| | Composition covering one surface of raw paper | | | | |
|---|---|---|---|---|---|
| Sample | Resin 1 | Resin 2 | Weight ratio of resin 1/ resin 2 | Type of titanium oxide | Weight % of titanium oxide with respect to whole composition | Laminated film thickness, μm |
| Example 1 | R1 | — | — | T1 | 10 | 25 |
| Example 2 | R1 | R2 | 90/10 | T1 | 10 | 25 |
| Example 3 | R1 | — | — | T1 | 10 | 30 |
| Example 4 | R1 | RM | 90/10 | T1 | 8 | 30 |
| Comparative Example 1 | R2 | — | — | T1 | 10 | 30 |

The symbols in the Table have the following significance:
R1: Polyethylene terephthalate
R2: Polypropylene
R3: Polyethylene
RM: Composition having a weight ratio of R2 and R3 = 1:1
T1: Titanium oxide of average particle diameter 0.3 μm

TABLE 2

| | Composition covering other surface of raw paper | | | | | | |
|---|---|---|---|---|---|---|---|
| Sample | Resin 3 | Resin 4 | Weight ratio of resin 3/ resin 4 | Type of powder | Weight % of calcium carbonate with respect to whole composition | Laminated film thickness, μm | Standard deviation of height above platform, mm |
| Example 1 | R1 | R2 | 98/2 | P1 | 7 | 25 | 0.2 |
| Example 2 | R1 | — | — | P1 | 7 | 30 | 0.2 |
| Example 3 | R1 | — | — | P1 | 7 | 30 | 0.2 |
| Example 4 | R1 | R2 | 98/2 | P1 | 20 | 30 | 0.1 |
| Comparative Example 1 | R3 | — | — | — | 0 | 30 | 0.7 |

The symbols in the Table have the following significance:
R1: Polyethylene terephthalate
R2: Polypropylene
R3: Polyethylene
P1: Calcium carbonate of average particle diameter 0.07 μm Curl was evaluated for a plurality of samples. To evaluate curl, the aforesaid support was wound around a core of diameter 10 cm, and left at a temperature of 50° C. for 6 hours. A sample of dimensions 5 cm length×5 cm width was then mounted on a flat plate, the height of the sample above the flat plate in the vertical and horizontal directions was measured at 1 cm intervals (36 points including the 4 corners of the sample), and the standard deviation from this height was calculated to give the curl.

What is claimed is:

1. A photographic printing paper support wherein one side of raw paper is covered by a composition containing titanium oxide dispersed in polyethylene terephthalate resin or a mixture of polyethylene terephthalate and at least one resin selected from resins which can be extruded at 270°-350° C., and the other side is covered by a composition containing calcium carbonate dispersed in polyethylene terephthalate resin or a mixture of polyethylene terephthalate with at least one resin selected from resins which can be extruded at 270°-350° C.

2. A photographic printing paper support of claim 1, wherein the ratio of the polyethylene terephthalate and the at least one resin selected from resins which can be extruded at 270°-350° C. lies in the range 100:0~80:20.

3. A photographic printing paper support of claim 2, wherein the at least one resin selected from resins which can be extruded at 270°-350° C. is at least one resin selected from resins other than polyolefin resins.

4. A photographic printing paper support of claim 1, wherein an average particle size of the titanium oxide lies in the range 0.1-0.8 μm.

5. A photographic printing paper support of claim 1, wherein an amount of the titanium oxide in the layer of composition containing titanium oxide lies in the range 2-20 wt %.

6. A photographic printing paper support of claim 1, wherein an average particle size of the calcium carbonate lies in the range 0.01-1.5 μm.

7. A photographic printing paper support of claim 1, wherein an amount of the calcium carbonate in the layer of composition containing calcium carbonate lies in the range 1-30 wt %.

8. A photographic printing paper support of claim 1, wherein the thickness of the resin layer covering each side of the raw paper lies in the range 5-50 μm.

9. A photographic printing paper comprising the support of claim 1 and a photographic emulsion coated on the support.

10. A photographic printing paper support of claim 1, wherein the at least one resin selected from resins which can be extruded at 270°-350° C. is a polyolefin resin, a polyether resin, a polyurethane resin, a polycarbonate resin, or a polystyrene resin.

* * * * *